United States Patent [19]

Matsumaru

[11] 4,144,076

[45] Mar. 13, 1979

[54] OPTICAL GLASS

[75] Inventor: Shizuo Matsumaru, Yokohama, Japan

[73] Assignee: Nippon Kogaku K.K., Tokyo, Japan

[21] Appl. No.: 855,627

[22] Filed: Nov. 29, 1977

[30] Foreign Application Priority Data

Dec. 7, 1976 [JP] Japan .................................. 51-146083

[51] Int. Cl.$^2$ ........................... C03C 3/14; C03C 3/12
[52] U.S. Cl. ..................................... 106/47 Q; 106/54; 106/52; 106/53
[58] Field of Search .................... 106/47 Q, 54, 52, 53

[56] References Cited

U.S. PATENT DOCUMENTS

| Re. 21,175 | 8/1939 | Morey | 106/47 Q |
| 3,958,999 | 5/1976 | Izumitani | 106/47 Q |

FOREIGN PATENT DOCUMENTS 1061976  2/1959  Fed. Rep. of Germany ............. 106/54

Primary Examiner—Helen McCarthy
Attorney, Agent, or Firm—Shapiro and Shapiro

[57] ABSTRACT

Optical glass of high refractive index and low dispersion comprises 25-40% of $B_2O_3$, 11-30% of ZnO, 28-44% of $La_2O_3$, 1-25% of $Y_2O_3$, 0-20% of alkaline earth metal oxides, 0-5% of $SiO_2$, 0-5% of $Al_2O_3$, 0-15% of PbO, 0-10% of $ZrO_2$ and 0-10% of $Ta_2O_5$, all percentages being by weight.

4 Claims, No Drawings

OPTICAL GLASS

BACKGROUND OF THE INVENTION

1. Field of the Invention

This invention relates to optical glass having high refractive index and low dispersion.

2. Description of the Prior Art

High refractive index, low dispersion optical glass heretofore has been formed of a basically $B_2O_3$-alkaline earth metal oxides-$La_2O_3$ system. In an optical glass of this type, a large quantity of alkaline earth metal oxides is required. Of the alkaline earth metal oxides, the use of appreciable amounts of MgO, CaO and SrO makes the resultant glass very unstable against devitrification. Also, the use of a substantial amount of the alkaline earth metal oxide. BaO greatly diminishes the chemical durability of the resultant glass. Thus, high refractive index, low dispersion optical glass made of a system which is basically $B_2O_3$-alkaline earth metal oxides-$La_2O_3$ is unsuitable for mass production because of its tendency to devitrify and its poor chemical durability, and therefore, its insufficiency as elements for optical instruments.

An improvement over such known glass is a high refractive index, low dispersion optical glass which has ZnO as one of the chief components, instead of alkaline earth metal oxides, thereby constituting an essentially three component system of $B_2O_3$-ZnO-$La_2O_3$. An example of this type of glass has a composition as follows, the values being present by weight:

|  |  |
|---|---|
| $B_2O_3$ | 29–43 |
| $La_2O_3$ | 16–27.5 |
| ZnO | 17–36 |
| $SiO_2$ | 1–7 |
| MgO + CaO + SrO | 1–11 |
| CdO | 0–6.5 |

However, such optical glass is low in $La_2O_3$ content which serves to impart the high refractive index and low dispersion properties to the glass. Consequently, in order to maintain for this glass the high refractive index and low dispersion properties, it is necessary to increase the ZnO content which, among the chief or essential components, is next to $La_2O_3$ in the degree of contribution for imparting high refractive index and low dispersion properties to the glass. However, this glass which contains such a substantial amount of ZnO, which is a glass network modifying oxide, has a low viscosity; also, the glass may not be said to be sufficiently stable against divitrification. This is a serious disadvantage insofar as mass-producing the glass.

SUMMARY OF THE INVENTION

It is an object of the present invention to provide a high refractive index, low dispersion optical glass which has a refractive index (nd) ranging from 1.69 to 1.80 and Abbe number ($\nu$ d) ranging from 43 to → 55, which is stable against devitrification and excellent in chemical durability and which is suitable for mass-production.

According to the present invention, ZnO is used instead of the alkaline earth metal oxides belonging to the $B_2O_3$-alkaline earth metals-$La_2O_3$ system. Then, $Y_2O_3$ is partially substituted for $La_2O_3$ in the three-component system of $B_2O_3$-ZnO-$La_2O_3$. As a result, a four component system of $B_2O_3$-ZnO-$La_2O_3$-$Y_2O_3$ is provided to thereby enable mass-production of high refractive index, low dispersion optical glass which is stable against devitrification and excellent in chemical durability.

DESCRIPTION OF THE PREFERRED EMBODIMENTS

In the four-component system of the invention, $Y_2O_3$, which is next to $La_2O_3$ in the degree of contribution to impart the high refractive index and low dispersion properties to the glass, is partially substituted for $La_2O_3$, whereby the $La_2O_3$ content may be lower than in conventional glasses to maintain the high refractive index and low dispersion properties. This leads to a decreased liquefaction temperature, and, accordingly, much higher stability of the glass against devitrification than furnished by the conventional glasses.

Also, with the optical glass of the invention, the ZnO content may be decreased by increasing the $La_2O_3$ content above that in the aforementioned prior art $B_2O_3$-ZnO-$La_2O_3$ system, and, as a result, increased viscosity is achieved together with much higher stability against devitrification.

With regard to chemical durability, $Y_2O_3$ contributes as much as $La_2O_3$ to impart chemical durability to the glass, and ZnO is better than alkaline earth metal oxides in imparting chemical durability to the glass. Thus, the glass of the present invention which uses $B_2O_3$, ZnO, $La_2O_3$ and $Y_2O_3$ as the requisite essential components affords greatly improved chemical durability over the conventional glasses which use $B_2O_3$, alkaline earth metal oxides and $La_2O_3$ as the requisite components and which use $B_2O_3$, ZnO and $La_2O_3$ and alkaline earth metal oxides such as MgO, CaO and SrO.

The four-components system of $B_2O_3$-ZnO-$La_2O_3$-$Y_2O_3$ has been found to be the best suited basic system for the mass production of high refractive index, low dispersion optical glass which is excellent in chemical durability and stable against devitrification. The optical glass of the present invention may be composed of these four requisite components and in addition thereto, alkaline earth metal oxides and $SiO_2$, $Al_2O_3$, PbO, $ZrO_2$, $Ta_2O_5$, etc. The addition of alkaline earth metal oxides contributes to decrease liquefaction temperature, and, accordingly, further higher stability of the glass against devitrification. The addition of $Al_2O_3$ contributes to decrease liquefaction temperature, and, accordingly, still further higher stability of the glass against devitrification. The addition of $Al_2O_3$ also improves the chemical durability of the glass. The addition of $SiO_2$ increases the viscosity of the glass which results in further stability of the glass against devitrification. $SiO_2$ also improves the chemical durability of the glass. The addition of PbO, $ZrO_2$ and $Ta_2O_5$ increases the refractive index (nd) of the glass which results in a glass of superior quality. $ZrO_2$ and $Ta_2O_5$ also contribute to improve the chemical durability of the glass. These additives may be used in accordance with the particular end use of the glass.

The contents of the foregoing four requisite components may be in the following ranges, all by weight percentage:

|  |  |
|---|---|
| $B_2O_3$ | 25–40 |
| ZnO | 11–30 |
| $La_2O_3$ | 28–44 |
| $Y_2O_3$ | 1–25 |

$B_2O_3$, if less than 25%, would make the glass unstable against devitrification, and if greater than 40%, would make the molten material separate into two phases. ZnO, if less than 11% and if greater than 30%, would make the glass unstable against devitrification. $La_2O_3$, if less than 28% and if greater than 44%, would make the glass unstable against devitrification. $Y_2O_3$, if less than 1% and if greater than 25%, would make the glass unstable against devitrification.

Also, the amounts to be added of alkaline earth metal oxides, $SiO_2$, $Al_2O_3$, PbO, $ZrO_2$ and $Ta_2O_5$ are in the following ranges:

alkaline earth metal oxides 0-20

| | |
|---|---|
| $SiO_2$ | 0-5 |
| $Al_2O_3$ | 0-5 |
| PbO | 0-15 |
| $ZrO_2$ | 0-10 |
| $Ta_2O_5$ | 0-10 |

Alkaline earth metal oxides, if greater than 20%, would make the glass unstable against devitrification. $SiO_2$, if greater than 5%, would be left unmolten during the melting process and require a long time for the melting process. $Al_2O_3$, if greater than 5%, would give rise to instability of the glass against devitrification. PbO, if greater than 15%, would increase the dispersion against the intended purpose. $ZrO_2$, if greater than 10%, would make the glass unstable against devitrification. $Ta_2O_5$, if greater than 10%, would lead to instability of the glass against devitrification.

Of the optical glasses according to the present invention, those having the following ranges of composition in percent by weight, possess refractive indices (nd) of 1.69 to 1.75 and Abbe numbers (ν d) of 50 to 55, and fall under a lower dispersion range among the high refractive index, low dispersion glasses.

| | |
|---|---|
| $B_2O_3$ | 30-40 |
| ZnO | 11-30 |
| $La_2O_3$ | 28-44 |
| $Y_2O_3$ | 1-25 | alkaline earth metal oxides 0-20

| | |
|---|---|
| $SiO_2$ | 0-5 |
| $Al_2O_3$ | 0-5 |
| PbO | 0-5 |
| $ZrO_2$ | 0-5 |
| $Ta_2O_5$ | 0-5 |

The optical glasses having the following ranges of composition, in percent by weight, possess refractive indices (nd) ranging from 1.69 to 1.74 and Abbe numbers (ν d) ranging from 52 to 55, and are lowest in dispersion.

| | |
|---|---|
| $B_2O_3$ | 30-40 |
| ZnO | 11-30 |
| $La_2O_3$ | 28-44 |
| $Y_2O_3$ | 1-25 | alkaline earth metal oxides 0-15

| | |
|---|---|
| $SiO_2$ | 0-5 |
| $Al_2O_3$ | 0-5 |

Of these, the optical glasses having the following ranges of composition, in percent by weight, are particularly stable against devitrification and suited for mass-production.

| | |
|---|---|
| $B_2O_3$ | 34-38 |
| ZnO | 12-16 |
| $La_2O_3$ | 35-41 |
| $Y_2O_3$ | 3-8 |
| $SiO_2$ | 2-5 |
| BaO | 0-3 |

The optical glass of the present invention may be produced by using corresponding oxides, carbonates, nitrates, etc. as the materials for the respective components, taking them in desired amounts by weighing, thoroughly mixing them, placing the mixed compound in a platinum crucible which is put into an electric furnace and heated to 1200° to 1400° C., stirring and homogenizing after melting and fining, and thereafter casting the glass into an iron mold and gradually cooling.

The compositions (percent by weight), refractive indices (nd), Abbe numbers (ν d) of some examples of the optical glass according to the present invention are shown in Table 1 below.

Table 1

| | 1 | 2 | 3 | 4 | 5 | 6 | 7 | 8 |
|---|---|---|---|---|---|---|---|---|
| $B_2O_3$ | 35.0 | 35.0 | 35.0 | 31.0 | 30.0 | 32.5 | 40.0 | 36.0 |
| ZnO | 15.0 | 12.0 | 15.0 | 14.0 | 11.0 | 13.0 | 11.0 | 15.0 |
| $La_2O_3$ | 40.0 | 28.0 | 35.0 | 31.0 | 30.0 | 32.5 | 44.0 | 38.0 |
| $Y_2O_3$ | 10.0 | 25.0 | 5.0 | 15.0 | 9.0 | 7.0 | 1.0 | 6.0 |
| MgO | — | — | 5.0 | — | 5.0 | 5.0 | — | — |
| CaO | — | — | — | 5.0 | 5.0 | 2.5 | — | — |
| SrO | — | — | 5.0 | — | 5.0 | 5.0 | — | — |
| BaO | — | — | — | 4.0 | 5.0 | 2.5 | — | — |
| $SiO_2$ | — | — | — | — | — | — | 4.0 | 5.0 |
| $Al_2O_3$ | — | — | — | — | — | — | — | — |
| PbO | — | — | — | — | — | — | — | — |
| $ZrO_2$ | — | — | — | — | — | — | — | — |
| $Ta_2O_5$ | — | — | — | — | — | — | — | — |
| ηd | 1.7391 | 1.7205 | 1.7143 | 1.7338 | 1.7266 | 1.7204 | 1.7032 | 1.7062 |
| νd | 51.4 | 52.0 | 52.8 | 52.0 | 51.7 | 52.2 | 54.6 | 53.9 |

| | 9 | 10 | 11 | 12 | 13 | 14 | 15 | 16 |
|---|---|---|---|---|---|---|---|---|
| $B_2O_2$ | 36.3 | 38.0 | 38.4 | 30.0 | 37.0 | 30.0 | 34.5 | 25.0 |
| ZnO | 13.5 | 27.0 | 12.6 | 15.0 | 13.0 | 15.0 | 18.0 | 25.0 |
| $La_2O_3$ | 38.1 | 28.0 | 38.4 | 30.0 | 39.5 | 35.0 | 37.0 | 30.0 |
| $Y_2O_3$ | 5.8 | 2.0 | 4.6 | 10.0 | 5.5 | 10.0 | 5.5 | 10.0 |
| MgO | — | — | — | — | — | — | — | — |
| CaO | — | — | — | — | — | — | — | — |
| SrO | — | — | — | — | — | — | — | — |

Table 1-continued

| | | | | | | | | |
|---|---|---|---|---|---|---|---|---|
| BaO | 2.2 | — | — | — | — | — | — | — |
| SiO₃ | 4.1 | — | — | — | — | — | — | — |
| Al₂O₃ | — | 5.0 | — | — | — | — | — | — |
| PbO | — | — | 6.0 | 15.0 | — | — | — | — |
| ZrO₃ | — | — | — | — | 5.0 | 10.0 | — | — |
| Ta₂O₅ | — | — | — | — | — | — | 5.0 | 10.0 |
| ηd | 1.7110 | 1.7205 | 1.7303 | 1.7711 | 1.7406 | 1.7779 | 1.7474 | 1.7916 |
| νd | 53.8 | 52.0 | 50.1 | 43.5 | 50.7 | 46.8 | 50.1 | 45.6 |

Table 2 below shows the acid resistivity which is the standard for the chemical durability of the optical glass of Example 9 and a conventional optical glass having the same refractive index (nd) and the same Abbe number ($\nu$ d) as Example 9. The acid resistivity was given by keeping a specific gravity gram of glass powder of size 420 to 590 μm at 100° C. in nitric acid of 0.01N for 60 minutes and calculating the rate of decrease (weight percent) from the weight of the sample and its quantity of decrease. As the rate of decrease (weight percent) is smaller, the glass is more excellent in chemical durability, and it is seen from Table 2 that the optical glass of the present invention is a substantial improvement.

Table 2
Chemical Durability

| | Acid Resistivity |
|---|---|
| Example 9 | 1.04% |
| Conventional optical glass | 1.26% |

According to the present invention, high refractive index, low dispersion optical glasses are provided which have refractive indices (nd) ranging from 1.69 to 1.80 and Abbe numbers ($\nu$ d) ranging from 43 to 55, which are stable against devitrification and which are excellent in chemical durability, as well as being suitable for mass-production.

I claim:

1. An optical glass having a refractive index (nd) ranging from 1.69 to 1.80 and Abbe number ($\nu$ d) ranging from 43 to 55 consisting essentially of in percent by weight:

| | |
|---|---|
| B₂O₃ | 25–40 |
| ZnO | 11–30 |
| La₂O₃ | 28–44 |
| Y₂O₃ | 1–25 | alkaline earth metal oxides 0–20

| | |
|---|---|
| SiO₂ | 0–5 |
| Al₂O₃ | 0–5 |
| PbO | 0–15 |
| ZrO₂ | 0–10 |
| Ta₂O₅ | 0–10 |

2. An optical glass according to claim 1, wherein:

| | |
|---|---|
| B₂O₃ | 30–40 |
| PbO | 0–5 |
| ZrO₂ | 0–5 |
| Ta₂O₅ | 0–5 |

3. An optical glass according to claim 2, wherein:

| | |
|---|---|
| PbO | 0 |
| ZrO₂ | 0 |
| Ta₂O₅ | 0 |

4. An optical glass according to claim 3, wherein: alkaline earth metal oxides 0–5

| | |
|---|---|
| B₂O₃ | 34–38 |
| ZnO | 12–16 |
| La₂O₃ | 35–41 |
| Y₂O₃ | 3–8 |
| SiO₂ | 2–5 |
| Al₂O₃ | 0 |
| BaO | 0–3 |

* * * * *